(12) United States Patent
Isobe et al.

(10) Patent No.: US 9,855,621 B2
(45) Date of Patent: Jan. 2, 2018

(54) AUTOMATIC WELDING MACHINE

(71) Applicant: NTN CORPORATION, Osaka (JP)

(72) Inventors: Hiroshi Isobe, Iwata (JP); Seigo Sakata, Iwata (JP); Yukihiro Nishio, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 52 days.

(21) Appl. No.: 15/155,577

(22) Filed: May 16, 2016

(65) Prior Publication Data

US 2016/0256952 A1 Sep. 8, 2016

Related U.S. Application Data

(63) Continuation of application No. PCT/JP2014/080206, filed on Nov. 14, 2014.

(30) Foreign Application Priority Data

Nov. 22, 2013 (JP) .................. 2013-242072

(51) Int. Cl.
*B23K 9/28* (2006.01)
*B23K 37/02* (2006.01)
(Continued)

(52) U.S. Cl.
CPC .............. *B23K 9/287* (2013.01); *B23K 9/007* (2013.01); *B23K 26/0884* (2013.01); *B23K 37/0241* (2013.01)

(58) Field of Classification Search
CPC .... B23K 9/007; B23K 37/0241; B23K 9/287; B23K 26/0884; B25J 9/0048;
(Continued)

(56) References Cited

U.S. PATENT DOCUMENTS 3,126,472 A * 3/1964 Brems ...................... B23K 9/02
219/124.22
3,132,617 A * 5/1964 Miller ...................... B23K 9/02
228/32
(Continued)

FOREIGN PATENT DOCUMENTS

CN 1876304 A 12/2006
DE 19955520 A1 5/2001
(Continued)

OTHER PUBLICATIONS

International Search Report dated Jan. 27, 2015, in corresponding International Application No. PCT/JP2014/080206.
(Continued)

*Primary Examiner* — Eric Stapleton

(57) ABSTRACT

Automatic welding machine includes: a welding torch mounted to a link actuation device set on a mount; and a one-or-more-axes linear motion actuator which causes the link actuation device to advance and retract relative to the mount. The link actuation device includes: a proximal end side link hub disposed on the mount; a distal end side link hub to which the welding torch is mounted; and three or more link mechanisms configured to couple the distal end side link hub to the proximal end side link hub. Each link mechanism includes proximal side and distal side end link members and an intermediate link member. Two or more link mechanisms are each provided with a posture changing actuator which arbitrarily changes the posture of the distal end side link hub relative to the proximal end side link hub.

8 Claims, 10 Drawing Sheets

(51) Int. Cl.
B23K 9/007 (2006.01)
B23K 26/08 (2014.01)
(58) Field of Classification Search
CPC . B25J 9/1623; B25J 13/087; B25J 9/12; B25J 11/00; B25J 17/0266; G05B 2219/40555; G05B 2219/39476; A61B 34/70; A61B 34/77; A61B 34/71; A61B 2090/064; A61B 2034/304; A61B 2034/305; Y10T 74/20335
USPC ............... 219/86.23, 86.7, 136, 145.1, 617; 700/245, 254, 257, 262, 264; 74/490.06; 414/4; 901/22, 23, 29, 15, 17, 2, 48, 8
See application file for complete search history.

(56) References Cited

U.S. PATENT DOCUMENTS

| | | | | |
|---|---|---|---|---|
| 3,923,166 A * | 12/1975 | Fletcher | ...................... | B25J 3/04 414/4 |
| 3,970,232 A * | 7/1976 | Melton | ................... | B23K 9/032 219/124.33 |
| 4,014,495 A * | 3/1977 | Oda | ........................ | B23K 9/032 219/119 |
| 4,119,259 A * | 10/1978 | Sakamoto | ............... | H01L 24/85 228/4.5 |
| 4,219,723 A * | 8/1980 | Maezawa | ............... | B23K 9/032 219/124.1 |
| 4,249,062 A * | 2/1981 | Hozumi | ................... | B23K 9/12 219/124.22 |
| 4,356,378 A * | 10/1982 | Cloos | ...................... | B23K 9/287 219/124.1 |
| 4,371,105 A * | 2/1983 | Melton | .................. | B23K 9/287 219/125.1 |
| 4,396,344 A * | 8/1983 | Sugimoto | ................ | B25J 9/046 414/706 |
| 4,538,047 A * | 8/1985 | Nakano | .................... | B23K 9/12 219/124.34 |
| 4,548,544 A * | 10/1985 | Van Appledorn | ........ | B21J 13/10 198/750.11 |
| 4,578,554 A * | 3/1986 | Coulter | .............. | B23K 26/0884 219/121.63 |
| 4,733,050 A * | 3/1988 | Grafius | .................... | B23K 9/32 219/125.1 |
| 4,972,347 A * | 11/1990 | Tarvin | .................... | B25J 9/1692 318/568.13 |
| 5,013,887 A * | 5/1991 | Gold | ........................ | B23K 9/12 219/124.34 |
| 5,225,647 A * | 7/1993 | Dufrenne | ............. | B23K 11/252 219/109 |
| 5,264,677 A * | 11/1993 | Sato | ...................... | B23K 9/0672 219/124.34 |
| 5,386,092 A * | 1/1995 | Dufrenne | ............. | B23K 11/252 219/117.1 |
| 5,388,935 A * | 2/1995 | Sheldon | ............... | B23Q 1/5462 248/631 |
| 5,399,837 A * | 3/1995 | Mangelsen | ............. | B23K 9/32 219/125.1 |
| 5,456,561 A * | 10/1995 | Poduje | .................... | B25J 9/042 414/744.5 |
| 5,630,955 A * | 5/1997 | Kosaka | ................ | B23K 9/0672 219/125.1 |
| 5,650,079 A * | 7/1997 | Shimogama | ........... | B23K 9/095 219/124.34 |
| 5,783,921 A * | 7/1998 | Handa | ...................... | B23K 9/10 219/124.1 |
| 5,893,296 A * | 4/1999 | Rosheim | .................. | G05G 5/03 74/490.03 |
| 5,961,858 A | 10/1999 | Britnell | | |
| 6,330,837 B1 * | 12/2001 | Charles | .................... | B25J 11/00 74/490.06 |
| 6,418,811 B1 * | 7/2002 | Rosheim | ............. | B25J 17/0266 414/729 |
| 6,497,548 B1 * | 12/2002 | Roy | ..................... | B23Q 1/5462 409/201 |
| 6,657,161 B2 * | 12/2003 | Marhofer | ............. | B23K 9/0216 219/125.11 |
| 6,719,506 B2 * | 4/2004 | Chang | .................... | B23Q 1/012 409/134 |
| 7,159,751 B2 * | 1/2007 | Vischer | ................ | B23K 20/005 228/4.5 |
| 7,275,332 B2 * | 10/2007 | Blanding | ................. | F16C 11/12 248/178.1 |
| 7,472,622 B2 * | 1/2009 | Isobe | ................... | B25J 17/0266 414/729 |
| 7,810,248 B2 * | 10/2010 | McMurtry | ........... | B25J 17/0266 33/503 |
| 7,842,904 B2 * | 11/2010 | Nakata | ................. | B23K 9/0671 219/124.01 |
| 7,860,609 B2 * | 12/2010 | Yanagita | ................ | B25J 9/1669 700/212 |
| 7,971,505 B2 * | 7/2011 | Isobe | ...................... | B25J 9/0048 74/490.05 |
| 8,225,692 B2 * | 7/2012 | Kock | .................... | B23Q 1/5462 74/490.03 |
| 8,316,961 B2 * | 11/2012 | Isobe | ................. | A61B 17/1631 128/898 |
| 8,581,146 B2 * | 11/2013 | Daniel | ................. | B23K 9/0735 219/137 R |
| 8,910,539 B2 * | 12/2014 | Long | ........................ | B25J 9/102 74/490.01 |
| 9,522,469 B2 | 12/2016 | Isobe et al. | | |
| 2002/0183122 A1 * | 12/2002 | Sone | ....................... | F16D 3/205 464/111 |
| 2003/0106230 A1 * | 6/2003 | Hennessey | ................. | B25J 7/00 33/645 |
| 2005/0159075 A1 * | 7/2005 | Isobe | ................... | B25J 17/0266 446/104 |
| 2005/0199085 A1 * | 9/2005 | Isobe | ...................... | B25J 9/0048 74/490.05 |
| 2006/0278622 A1 | 12/2006 | Inoue et al. | | |
| 2006/0287769 A1 * | 12/2006 | Yanagita | ................ | B25J 9/1669 700/245 |
| 2008/0028881 A1 * | 2/2008 | Sone | ..................... | B25J 17/0266 74/471 R |
| 2010/0058602 A1 * | 3/2010 | McMurtry | ........... | B25J 17/0266 33/503 |
| 2011/0056074 A1 * | 3/2011 | Jonas | ................... | B23K 1/0016 29/829 |
| 2012/0043100 A1 * | 2/2012 | Isobe | ................. | A61B 17/1631 173/42 |
| 2015/0088308 A1 * | 3/2015 | Isobe | ...................... | B25J 9/0048 700/245 |
| 2015/0114163 A1 * | 4/2015 | Rosheim | ................ | B25J 9/0045 74/490.03 |

FOREIGN PATENT DOCUMENTS

| | | |
|---|---|---|
| EP | 0 997 239 A2 | 5/2000 |
| JP | 6-79472 | 3/1994 |
| JP | 2000-126954 | 5/2000 |
| JP | 2002-120093 | 4/2002 |
| JP | 2010-253538 | 11/2010 |
| JP | 2011-11247 | 1/2011 |
| JP | 2011-156590 | 8/2011 |
| JP | 2013-202725 | 10/2013 |
| WO | WO 99/10137 | 3/1999 |

OTHER PUBLICATIONS

International Preliminary Report on Patentability dated Jun. 2, 2016 in corresponding International Patent Application No. PCT/JP2014/080206.
Extended European Search Report dated Aug. 7, 2017 in corresponding European Patent Application No. 14864721.7.
Japanese Office Action dated Aug. 29, 2017 in corresponding Japanese Patent Application No. 2013-242072.

(56) References Cited

OTHER PUBLICATIONS

Chinese Office Action dated Sep. 29, 2017 in corresponding Chinese Patent Application No. 201480062958.1.

* cited by examiner

AUTOMATIC WELDING MACHINE

CROSS REFERENCE TO THE RELATED APPLICATION

This application is a continuation application, under 35 U.S.C. §111(a) of international patent application No. PCT/JP2014/080206, filed Nov. 14, 2014, which claims priority to Japanese patent application No. 2013-242072, filed Nov. 22, 2013, the entire disclosure of which is herein incorporated by reference as a part of this application.

BACKGROUND OF THE INVENTION

Field of the Invention

The present invention relates to an automatic welding machine that is used in, for example, production process and that can fast and high-precisely perform automatic and fine welding work, without manual work.

Description of Related Art

A conventional automatic welding machines ahs been known in which an articulated robot has a welding torch mounted on a leading end thereof, as suggested in Patent Documents 1 to 3 listed below.

RELATED DOCUMENT

Patent Document

[Patent Document 1] JP Laid-open Patent Publication No. H06-079472
[Patent Document 2] JP Laid-open Patent Publication No. 2002-120093
[Patent Document 3] JP Laid-open Patent Publication No. 2010-253538

Such an automatic welding machine using an articulated robot can have a wide work range, but the main body of the robot is large. Thus, when the operation range is taken into consideration, a wide dedicated space is required in order to install the automatic welding machine. In addition, since the articulated robot has a plurality of operation axes, the conventional automatic welding machine cannot perform fine and fast operation and has difficulty in performing precise welding.

SUMMARY OF THE INVENTION

An object of the present invention is to provide an automatic welding machine that is compact in size and that can perform fast, high-accuracy, and fine operation.

An automatic welding machine according to the present invention includes a link actuation device which includes: a proximal end side link hub; a distal end side link hub; and three or more link mechanisms which each couple the distal end side link hub to the proximal end side link hub such that a posture of the distal end side link hub can be changed relative to the proximal end side link hub. Each of the link mechanisms includes: a proximal side end link member having one end rotatably coupled to the proximal end side link hub; a distal side end link member having one end rotatably coupled to the distal end side link hub; and an intermediate link member having opposite ends rotatably coupled to other ends of the proximal side end link member and the distal side end link member, respectively. Each of the link mechanisms has such a shape that a geometric model of the link mechanism represented by straight lines shows symmetry between a proximal end side portion thereof and a distal end side portion thereof with respect to a center portion of the intermediate link member. Two or more link mechanisms among the three or more link mechanisms are each provided with a posture changing actuator which arbitrarily changes the posture of the distal end side link hub relative to the proximal end side link hub.

In the automatic welding machine, the link actuation device is disposed on a mount while the proximal end side link hub is directly or indirectly fixed to the mount, a welding torch is mounted to the distal end side link hub, and the link actuation device is provided with both or either one of a one-or-more-axes linear motion actuator which causes the link actuation device to advance and retract relative to the mount, and a one-or-more-axes linear motion actuator which causes a workpiece to advance and retract relative to the mount, the workpiece serving as a target to be subjected to welding work performed by the welding torch.

In this specification, "proximal end side" and "distal end side" are used in the following meaning. That is, the point where the central axis of the revolute pair between the proximal end side link hub and each proximal side end link member and the central axis of the revolute pair between each proximal side end link member and its corresponding intermediate link member cross each other is referred to as the "spherical link center" of the proximal end side link hub. Then, the straight line that passes this spherical link center of the proximal end side link hub and that crosses the central axis of the revolute pair between the proximal end side link hub and each proximal side end link member at a right angle is referred to as the "proximal end side link hub central axis". Then, when viewed from the intersection where the proximal end side link hub central axis crosses, the direction toward the spherical link center on the proximal end side is referred to as "proximal end side".

Also, the point where the central axis of the revolute pair between the distal end side link hub and each distal side end link member and the central axis of the revolute pair between each distal side end link member and its corresponding intermediate link member cross each other is referred to as the "spherical link center" of the distal end side link hub. Then, the straight line that passes this spherical link center of the distal end side link hub and that crosses the central axis of the revolute pair between the distal end side link hub and each distal side end link member at a right angle is referred to as the "distal end side link hub central axis". Then, when viewed from the intersection where the distal end side link hub central axis crosses, the direction toward the spherical link center on the distal end side is referred to as "distal end side".

In the link actuation device used in this automatic welding machine, the proximal end side link hub, the distal end side link hub and the three or more link mechanisms cooperate together to form a two-degrees-of-freedom mechanism in which the distal end side link hub is rotatable in two orthogonal axial directions, relative to the proximal end side link hub. This two-degrees-of-freedom mechanism is compact in size, but can realize a wide range of movement of the distal end side link hub. This compactness allows fast operation to be performed. For example, the maximum bend angle between the proximal end side link hub central axis and the distal end side link hub central axis is about ±90°, and the angle of traverse of the distal end side link hub relative to the proximal end side link hub can be set in a range of 0° to 360°. By controlling operation of each posture control actuator, the posture of the distal end side link hub relative to the proximal end side link hub can be arbitrarily changed.

This automatic welding machine performs welding onto the workpiece by means of the welding torch mounted to the distal end side link hub, while causing the one-or-more-axes linear motion actuator to move the link actuation device or the workpiece on a plane, and while changing the posture of the distal end side link hub relative to the proximal end side link hub by actuating the link actuation device. Accordingly, welding can be performed on faces in a plurality of directions of the workpiece, at angles relative to the workpiece. In addition, the link actuation device having the welding torch mounted thereto has a wide range of movement of the distal end side link hub and can perform fast operation. Thus, fine and fast operation of the leading end of the welding torch can be realized. Thus, precise welding work can be performed onto the workpiece.

In the present invention, the one-or-more-axes linear motion actuator may cause the link actuation device or the workpiece to advance and retract on a plane perpendicular to the proximal end side link hub central axis. In this case, welding work on a plane perpendicular to the proximal end side link hub central axis, i.e., for example, on a horizontal plane, is rendered to be easy.

In the present invention, the welding torch may be mounted to the distal end side link hub such that a central axis of a leading end portion, of the welding torch, which performs welding work onto the workpiece is aligned with the distal end side link hub central axis. In this case, since the angle of the distal end side link hub and the angle of the leading end portion of the welding torch become identical to each other, posture control for the leading end portion of the welding torch is easy.

In the present invention, the welding torch may be mounted to the distal end side link hub such that a leading end portion, of the welding torch, which performs welding work onto the workpiece faces the proximal end side and protrudes to the proximal end side relative to the proximal end side link hub. The welding torch has an elongated shape in many cases. Thus, if the welding torch is disposed such that the leading end portion thereof faces the distal end side, the moment of inertia is increased, which could cause reduced moving speed or lowered positioning accuracy. However, if the welding torch is disposed as in this configuration, the position of the leading end portion of the welding torch comes closer to the rotation center of the link actuation device. Thus, the moment of inertia of the welding torch can be reduced, and fast operation and high positioning accuracy can be realized.

In the present invention, a wire supply device may be provided that automatically supplies a welding rod to the welding torch. If the wire supply device is provided, even when the distance between the workpiece and the leading end portion of the welding torch varies due to operation of the link actuation device, stable welding can be realized.

In the present invention, the welding torch may be mounted to distal end side link hub via a torch advancing and retracting linear motion actuator which advances and retracts along the distal end side link hub central axis. According to this configuration, even when the distance between the workpiece and the leading end portion of the welding torch greatly varies due to operation of the link actuation device, the change in the distance can be corrected and stable welding can be realized. In addition, welding can be performed even onto portions at different positions in the direction of the distal end side link hub central axis in the workpiece.

In the present invention, preferably, on each of the proximal end side and the distal end side, in the link actuation device, an angle between the central axis of the revolute pair between the link hub and each end link member and the central axis of the revolute pair between each end link member and the intermediate link member is less than 90°. By setting the angle at less than 90°, a large space can be secured inside the arrangement of the link mechanisms. Thus, it is easy to dispose the welding torch in the space inside the arrangement of the link mechanisms.

In the present invention, when the welding torch has a curved portion, a part of the welding torch may be disposed between any two link mechanisms among the three or more link mechanisms. By disposing the welding torch between any two link mechanisms, interference between the welding torch and the link mechanisms can be prevented. Accordingly, even in the case of a configuration in which the welding torch is disposed in the space inside the arrangement of the link mechanisms, increase in size of the link actuation device can be prevented.

In the present invention, the one-or-more-axes linear motion actuator may be configured as a two-axis linear motion actuator obtained by combining two linear motion actuators which advance and retract on a plane perpendicular to the proximal end side link hub central axis and which respectively have different advancing and retracting directions. In this case, this actuator assembly may cause the link actuation device to advance and retract relative to the mount. By employing a one-or-more-axes linear motion actuator in the form of an actuator assembly, the welding arc can be moved along with a plane perpendicular to the proximal end side link hub central axis, and thus, welding can be performed onto the entire peripheral surface of the workpiece. In addition, when the actuator assembly causes the link actuation device to advance and retract relative to the mount, the workpiece need not be moved. Thus, fast operation of welding can be realized even when welding is performed onto a large workpiece.

The proximal end side link hub may be fixed to the downwardly-facing stage of the actuator assembly, the link actuation device may be disposed such that the distal end side link hub faces upward, and the welding torch may be disposed such that the leading end portion thereof faces the proximal end side and protrudes to the proximal end side relative to proximal end side link hub. In this case, the leading end portion of the welding torch among the components of the automatic welding machine is located in the lowermost portion, and thus, the automatic welding machine and the workpiece are less likely to interfere with each other.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
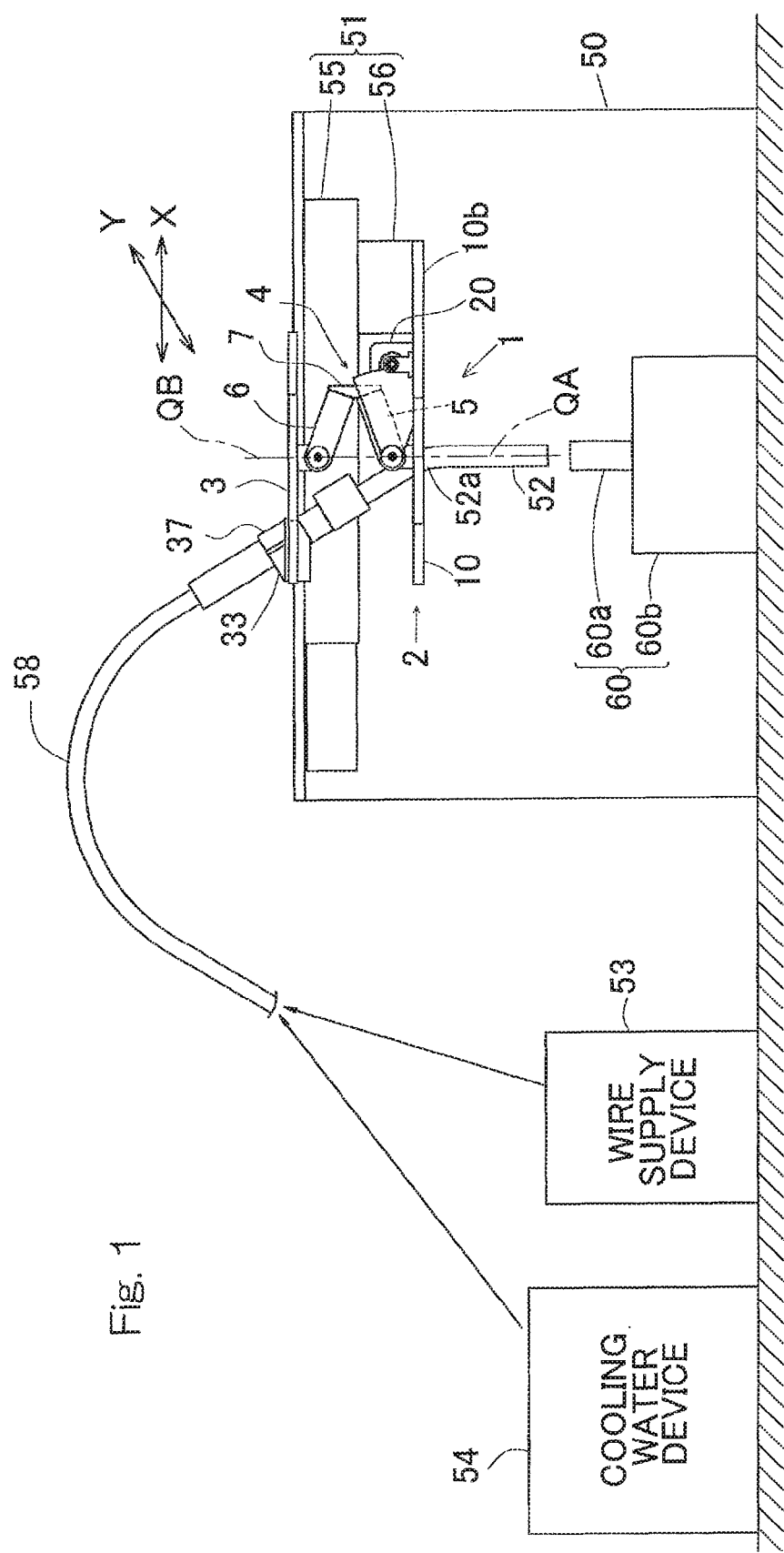
FIG. 1 is a front view of an automatic welding machine according to a first embodiment of the present invention, shown with a part thereof omitted.
Figure 2:
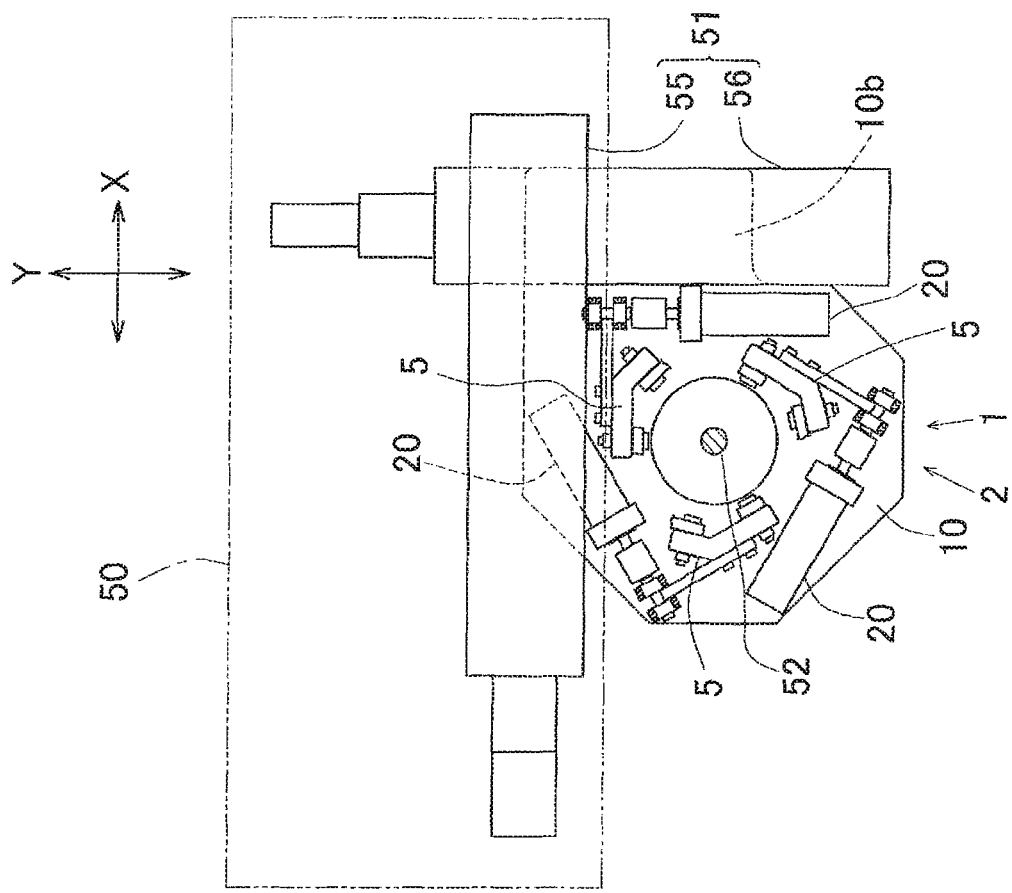
FIG. 2 is a plan view of the automatic welding machine, shown with a part thereof omitted.
Figure 2:
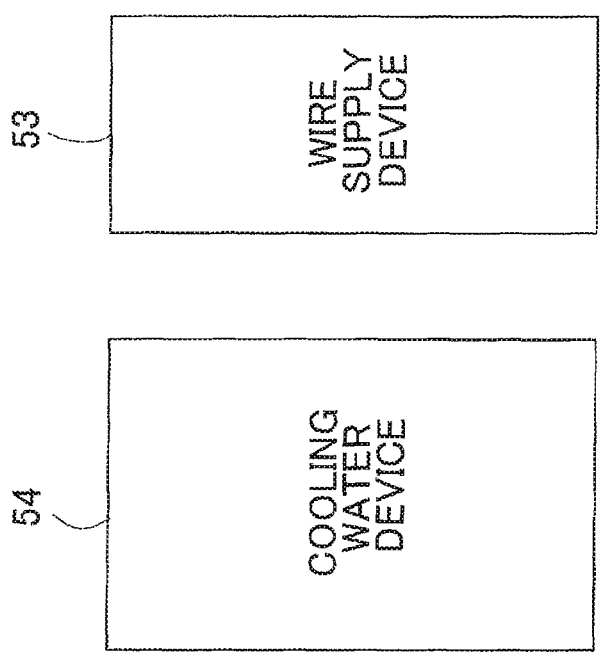

A first embodiment of the present invention will be described with reference to FIG. 1 to FIG. 7. As shown in FIG. 1 and FIG. 2, this automatic welding machine includes: a mount 50 which is fixed to a work table or the ground; a link actuation device 1 mounted on the mount 50 via an XY stage 51; and a welding torch 52 fitted to this link actuation device 1. The XY stage 51 includes an actuator assembly configured as a two-axis linear motion actuator obtained by combining two linear motion actuators. At positions distanced from the mount 50, a wire supply device 53 and a cooling water device 54 are provided.

The XY stage 51 includes: an X-axis linear motion actuator 55 which is fixed to the mount 50 and which advances and retracts in the left-right direction (X-axis direction); and a Y-axis linear motion actuator 56 which is fixed to a stage provided on the bottom face of the X-axis linear motion actuator 55 and which advances and retracts in the front-rear direction (Y-axis direction). The bottom face of the Y-axis linear motion actuator 56 serves as the stage where the link actuation device 1 is disposed. Fixation of the X-axis linear motion actuator 55 to the mount 50 and fixation of the Y-axis linear motion actuator 56 to the X-axis linear motion actuator 55 are realized by means of, for example, bolts.

Figure 3:
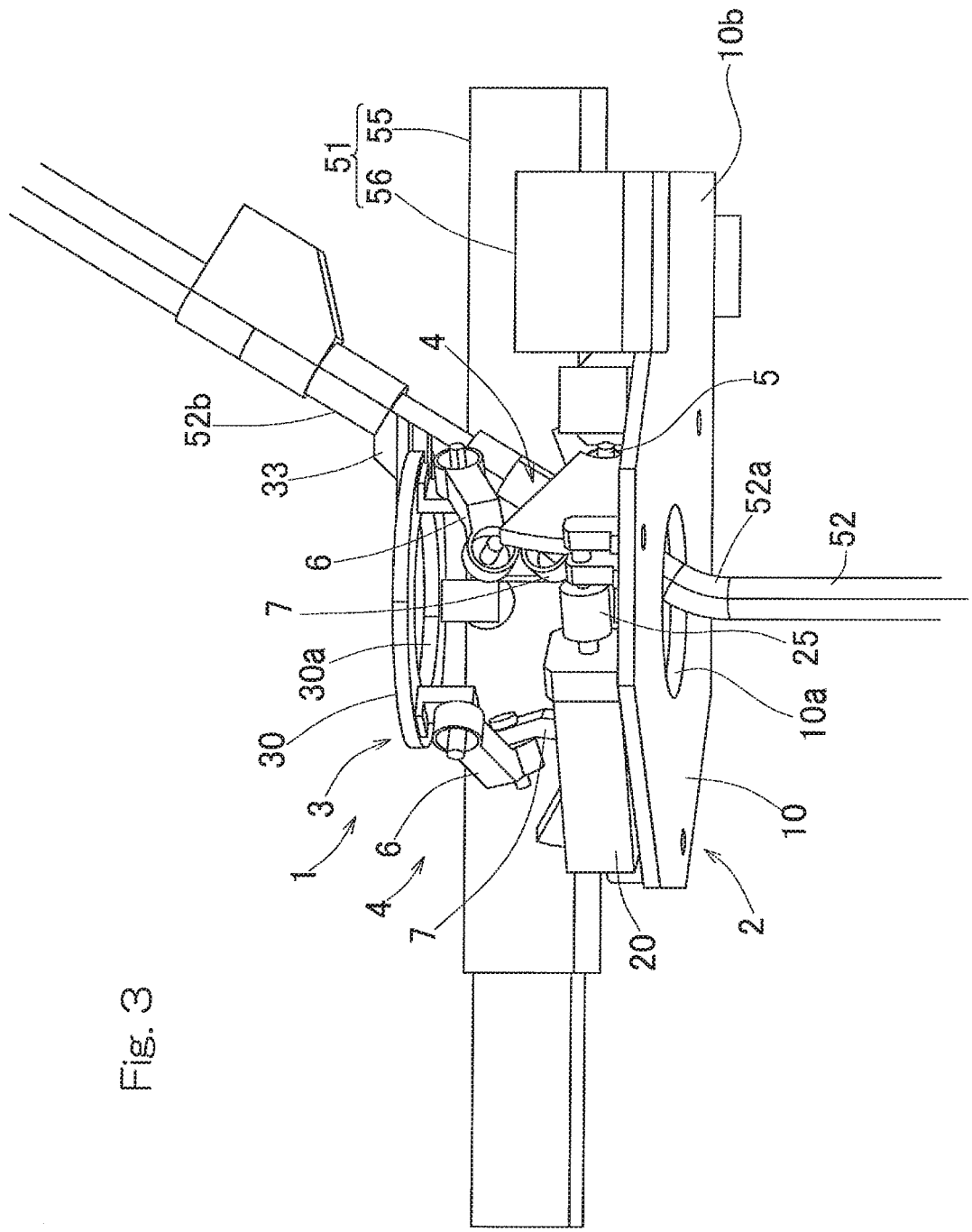
FIG. 3 is a perspective view showing a link actuation device of the automatic welding machine.

The link actuation device 1 will be described. As shown in FIG. 3, the link actuation device 1 is of a type in which a distal end side link hub 3 is coupled to a proximal end side link hub 2 via three link mechanisms 4 such that the posture of the distal end side link hub 3 can be changed relative to the proximal end side link hub 2. Each link mechanism 4 is composed of a proximal side end link member 5, a distal side end link member 6, and an intermediate link member 7, and forms a quadric chain link mechanism composed of four revolute pairs. One end of the proximal side end link member 5 is rotatably coupled to the proximal end side link hub 2, and one end of the distal side end link member 6 is rotatably coupled to the distal end side link hub 3. The intermediate link member 7 has its opposite ends rotatably coupled to the other ends of the proximal side and distal side end link members 5 and 6, respectively.

Figure 4:
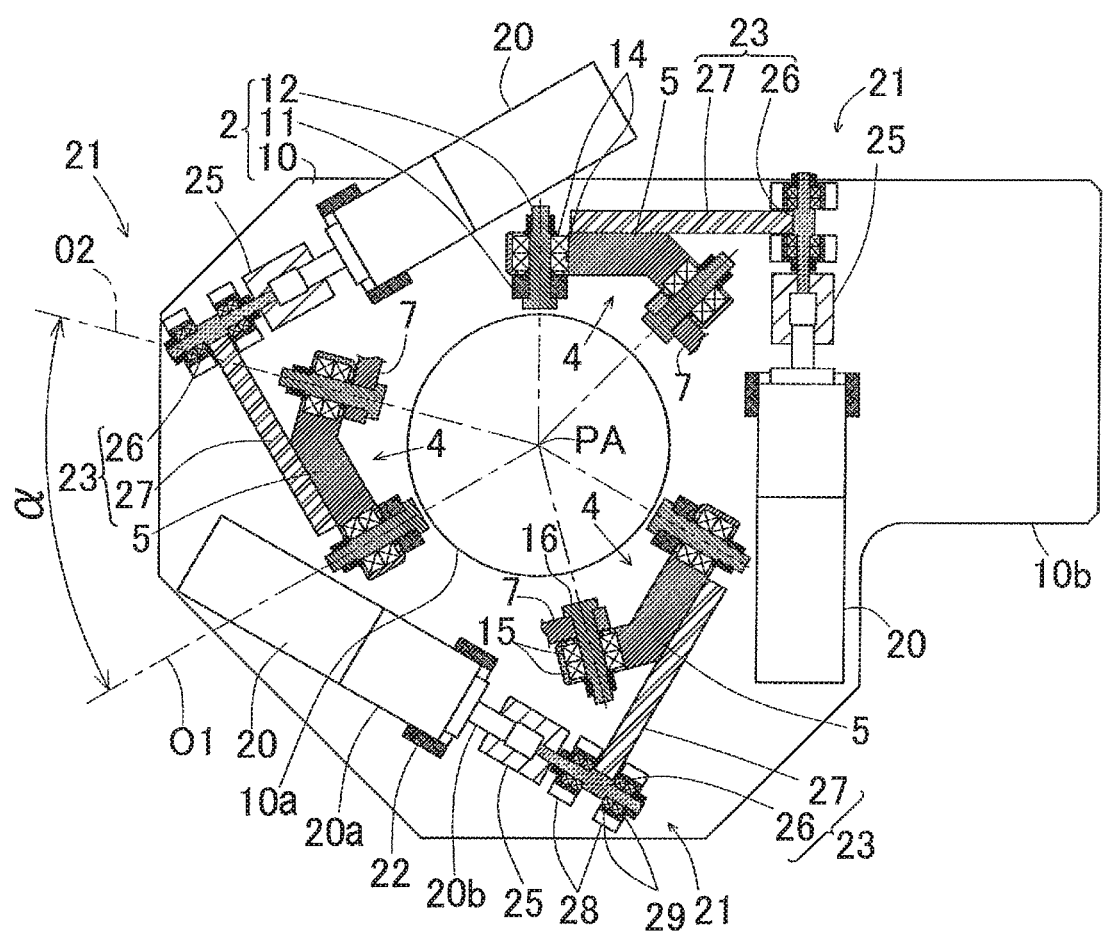
FIG. 4 is a transverse cross-sectional view of a proximal end side link hub and the like of the link actuation device.
Figure 5:
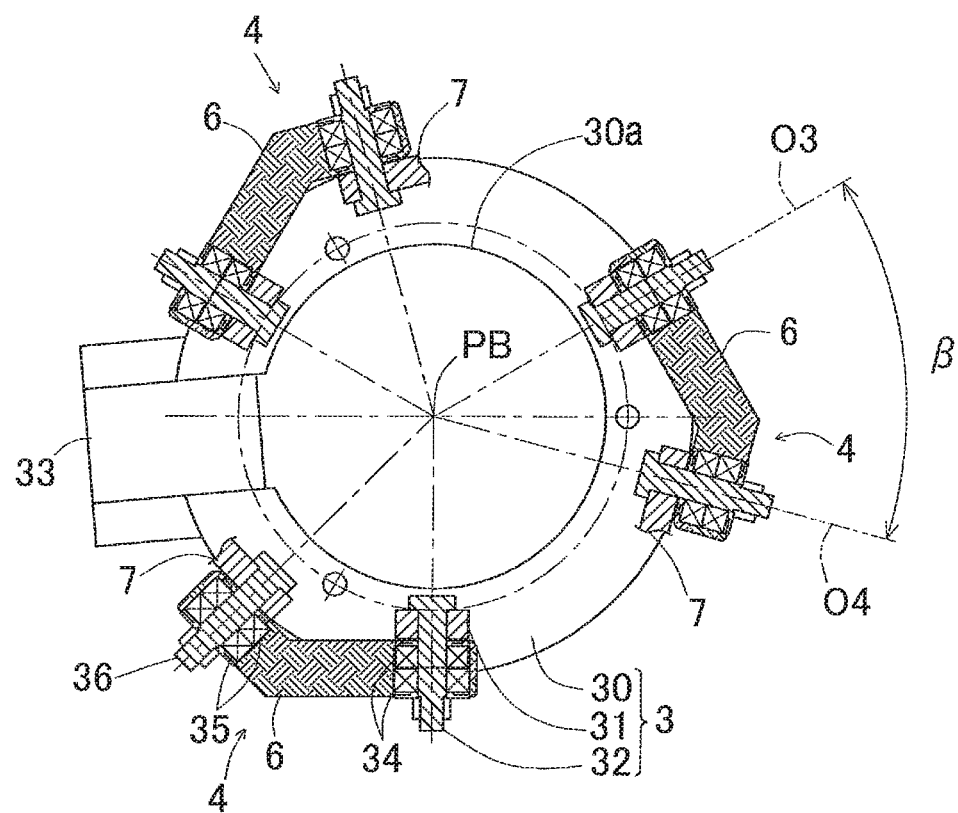
FIG. 5 is a transverse cross-sectional view of a distal end side link hub of the link actuation device.

FIG. 4 is a transverse cross-sectional view of a proximal end side including the proximal end side link hub. FIG. 5 is a transverse cross-sectional view of a distal end side including the distal end side link hub. As shown in these figures, the link actuation device 1 is formed by combining two spherical link mechanisms. In the link actuation device, the central axis of the revolute pair between the proximal end side link hub 2 and each proximal side end link member 5, and the central axis of the revolute pair between each proximal side end link member 5 and its corresponding intermediate link member 7 cross each other at a proximal end side spherical link center PA. Similarly, the central axis of the revolute pair between the distal end side link hub 3 and each distal side end link member 6 and the central axis of the revolute pair between each distal side end link member 6 and its corresponding intermediate link member 7 cross each other at a distal end side spherical link center PB.

Further, the distance from the proximal end side spherical link center PA to the revolute pair between the proximal end side link hub 2 and each proximal side end link member 5 is identical, and the distance from the proximal end side spherical link center PA to the revolute pair between each proximal side end link member 5 and its corresponding intermediate link member 7 is also identical. The first central axis of the revolute pair between the proximal side end link member 5 and the intermediate link member 7 may form a certain cross angle, or may be parallel relative to a second central axis described latter. Similarly, the distance from the distal end side spherical link center PB to the revolute pair between the distal end side link hub 3 and each distal side end link member 6 is identical, and the distance from the distal end side spherical link center PB to the revolute pair between each distal side end link member 6 and its corresponding intermediate link member 7 is identical. The second central axis of the revolute pair between the distal side end link member 6 and the intermediate link member 7 may also form a certain cross angle, or may be parallel relative to the first central axis.

Figure 6:
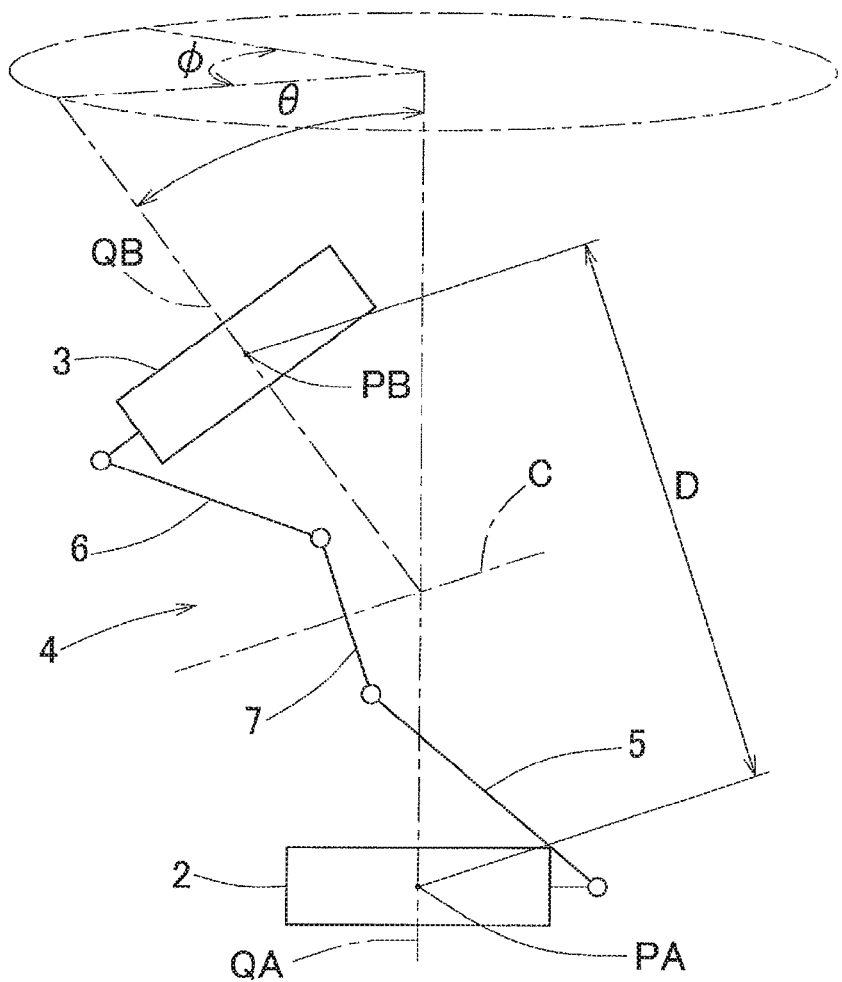
FIG. 6 shows one link mechanism of the link actuation device depicted with straight lines.

The three link mechanisms 4 have a geometrically identical configuration. The geometrically identical configuration means that, as shown in FIG. 6, a geometric model depicted in straight lines representing the link members 5, 6, and 7, i.e., a model depicted with the revolute pairs and straight lines connecting these revolute pairs, represents a shape in which the proximal end side portion thereof and the distal end side portion thereof are symmetrical with each other with respect to the center portion of the intermediate link member 7. FIG. 6 is a diagram showing one link mechanism 4 of the link actuation device 1 depicted in straight lines. The link mechanism 4 according to this embodiment is of a rotation symmetrical type, and employs a positional configuration in which the positional relationship between the proximal end side link hub 2 and the proximal side end link member 5, and the distal end side link hub 3 and the distal side end link member 6, is in rotation symmetry relative to a center line C of the intermediate link member 7.

The proximal end side link hub 2, the distal end side link hub 3 and the three link mechanisms 4 cooperate together to form a two-degrees-of-freedom mechanism in which the distal end side link hub 3 is rotatable in two orthogonal axial directions, relative to the proximal end side link hub 2. In other words, the mechanism allows the distal end side link hub 3 to rotate with two degrees of freedom to change its posture, relative to the proximal end side link hub 2. This two-degrees-of-freedom mechanism is compact in size, but can realize a wide range of movement of the distal end side link hub 3 relative to the proximal end side link hub 2. This compactness allows fast operation to be performed.

For example, a straight line that passes the proximal end side spherical link center PA and that crosses, at a right angle, the central axis of the revolute pair between the proximal end side link hub 2 and each proximal side end link member 5 is defined as a proximal end side link hub central axis QA. In addition, a straight line that passes the distal end side spherical link center PB and that crosses, at a right angle, the central axis of the revolute pair between the distal end side link hub 3 and each distal side end link member 6 is defined as a distal end side link hub central axis QB. In this case, the maximum value (maximum bend angle) of a bend angle θ between the proximal end side link hub central axis QA and the distal end side link hub central axis QB can be about ±90°. An angle of traverse Φ of the distal end side link hub 3 relative to the proximal end side link hub 2 can be set in a range of 0° to 360°.

The bend angle θ means a vertical angle formed when the distal end side link hub central axis QB is inclined relative to the proximal end side link hub central axis QA. The angle of traverse Φ means a horizontal angle formed when the distal end side link hub central axis QB is inclined relative to the proximal end side link hub central axis QA. Even if the posture of each link mechanism 4 changes, the distance D between the proximal end side spherical link center PA and the distal end side spherical link center PB does not change.

In the actuation device body 1, while the following conditions (1) to (4) are satisfied, the angle and the positional relationship between the intermediate link member 7 and the proximal side end link member 5 is the same as the angle and the positional relationship between the intermediate link member 7 and the distal side end link member 6 with respect to the symmetry plane of the intermediate link member 7. In this case, due to the geometrical symmetry, a proximal side composed of the proximal end side link hub 2 and the proximal side end link member 5 will move in the same manner as a distal side composed of the distal end side link hub 3 and distal side end link member 6.

(1) The angle between the central axes of the revolute pairs between the proximal side/distal side end link members 5, 6 and the proximal end side/distal end side link hub 2, 3, in the link mechanisms 4 are identical with each other, and the lengths between the revolute pairs and the proximal end side/distal end side spherical link centers PA, PB are identical with each other.

(2) The central axis of the revolute pair between the proximal side/distal side end link member 5, 6 and the proximal end side/distal end side link hub 2, 3 and the central axis of the revolute pair between the proximal side/distal side end link member 5, 6 and the intermediate link member 7 of each link mechanism 4 cross the spherical link center PA, PB on the proximal end side/distal end side.

(3) The geometrical shape of the proximal side end link member 5 and the geometrical shape of the distal side end link member 6 are identical to each other.

(4) Also with respect to the intermediate link member 7, the shape on the proximal end side and the shape on the distal end side are identical to each other.

As shown in FIG. 4, the proximal end side link hub 2 includes: a base 10 having a flat plate shape; three support shaft mounting members 11 provided at equal intervals in the circumferential direction around a through-hole 10a defined in the base 10; and three support shafts 12 respectively mounted to the support shaft mounting members 11. The base 10 has the round through-hole 10a formed in a center portion thereof, and a part of the base 10 serves as a stage mounting portion 10b to be fixed to the Y-axis linear motion actuator 56 (FIG. 1).

One end of the proximal side end link member 5 is rotatably supported via two bearings 14 by each support shaft 12. A rotation shaft 16 provided at one end of the intermediate link member 7 is rotatably supported via two bearings 15 by the other end of the proximal side end link member 5. Each of the bearings 14, 15 is a ball bearing such as, for example, a deep groove ball bearing or an angular contact ball bearing, and is fixed under a predetermined amount of preload applied by being fastened with a nut. An angle α between a central axis O1 of the revolute pair between the proximal end side link hub 2 and the proximal side end link member 5, and a central axis O2 of the revolute pair between the proximal side end link member 5 and the intermediate link member 7 is less than 90°. In the present embodiment, the angle α is 45°.

On the base 10, each of all the three link mechanisms 4 is provided with a posture changing actuator 20 and a speed reducing mechanism 21. The posture changing actuator 20 arbitrarily changes the posture of the distal end side link hub 3 relative to the proximal end side link hub 2 by rotating the proximal side end link member 5. The speed reducing mechanism 21 reduces the operation speed of the posture changing actuator 20 to transmit the resultant operation speed to the proximal side end link member 5.

The posture changing actuator 20 is a rotary actuator, more specifically, a servomotor equipped with a speed reducer 20a, and is fixed to the base 10 by means of a motor fixing member 22. The speed reducing mechanism 21 is composed of the speed reducer 20a of the posture changing actuator 20, and a geared speed reducing unit 23. The posture changing actuator 20 and the speed reducing mechanism 21 may be provided in only two of the three link mechanisms 4. When at least two link mechanisms 4 are provided with the posture changing actuator 20 and the speed reducing mechanism 21, it is possible to determine the posture of the distal end side link hub 3 relative to the proximal end side link hub 2.

The geared speed reducing unit 23 includes: a small gear 26 coupled to an output shaft 20b of the posture changing actuator 20 via a coupling 25 in a rotation transmittable manner; and a large gear 27 fixed to the proximal side end link member 5 and meshed with the small gear 26. The small gear 26 has shank portions on opposite sides thereof, and each of the shank portions is rotatably supported via two bearing 29 by a rotation support member 28 fixed to the base 10. In the present embodiment, each of the small gear 26 and the large gear 27 is a spur gear, and the large gear 27 is a sector gear having gear teeth formed only on the peripheral surface of the arc portion thereof.

The large gear 27 has a radius of the pitch circle greater than that of the small gear 26. The rotation of the output shaft 20b of the posture changing actuator 20 is transmitted to the proximal side end link member 5 after the rotation has been reduced in speed and made into rotation about the rotation axis O1 of the revolute pair between the proximal end side link hub 2 and the proximal side end link member 5. The speed reduction ratio is 10 or higher, for example. In the present embodiment, a spur gear is employed as the speed reducing mechanism 21, but another mechanism (for example, bevel gear or worm mechanism) may be used. In the present embodiment, the large gear 27 is a member separate from the proximal side end link member 5, but may be formed integrally with the proximal side end link member 5.

The rotation axis of the posture changing actuator 20 and the rotation axis of the small gear 26 are on the same axis. These rotation axes are parallel to the axis O1 of the revolute pair between the proximal end side link hub 2 and the proximal side end link member 5, and at the same level in height from the base 10.

As shown in FIG. 5, the distal end side link hub 3 is composed of an distal end member 30 having an annular plate shape and having a circular through-hole 30a in a center portion thereof, three support shaft mounting members 31 provided at equal intervals in the circumferential direction around the through-hole 30a in the distal end member 30, and three support shafts 32 respectively mounted to the support shaft mounting members 31. A torch mounting member 33 is provided at a position on the outer periphery of the distal end member 30, and is fixed with the use of, for example, bolts.

One end of the distal side end link member 6 is rotatably supported via two bearings 34 by each support shaft 32. A rotation shaft 36 provided at one end of the intermediate link member 7 is rotatably supported via two bearings 35 by the other end of the distal side end link member 6. Each bearing 34, 35 is a ball bearing such as, for example, a deep groove ball bearing or an angular contact ball bearing, and is fixed under a predetermined amount of preload applied by being fastened with a nut. An angle β between a central axis O3 of the revolute pair between the distal end side link hub 3 and the distal side end link member 6, and a central axis O4 of the revolute pair between the distal side end link member 6 and the intermediate link member 7 is the same as the angle α.

As shown in FIG. 1, in the link actuation device 1, the face on the distal end side of the stage mounting portion 10b of the base 10 is fixed with, for example, bolts to the stage, facing downward, of the Y-axis linear motion actuator 56. Thus, the link actuation device 1 is disposed such that: the proximal end side link hub 2 is on the lower side and the distal end side link hub 3 is on upper side; and the proximal end side link hub central axis QA extends in the vertical direction. Accordingly, by advancing and retracting the X-axis linear motion actuator 55 and the Y-axis linear motion actuator 56, the link actuation device 1 can be moved on a plane (horizontal plane in the present embodiment) perpendicular to the proximal end side link hub central axis QA.

Figure 7:
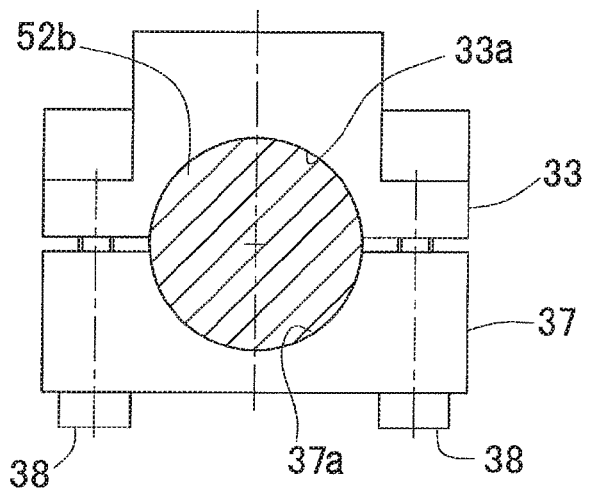
FIG. 7 is a cross-sectional view of a mounting portion of a welding torch relative to the proximal end side link hub of the link actuation device.

As shown in FIG. 3, the welding torch 52 has a curved portion 52a, and is mounted to the torch mounting member 33 of the distal end member 30. Specifically, as shown in FIG. 7, a cylindrical grip portion 52b of the welding torch 52 is fitted in a recess 33a of the torch mounting member 33, the recess 33a having a semicircular cross section. Then, a torch holding member 37 is placed over the grip portion 52b from the opposite side to the torch mounting member 33 thereby fitting the grip portion 52b of the welding torch 52 in a recess 37a having a semicircular cross section. Thereafter, the torch mounting member 33 and the torch holding member 37 are joined together by means of bolts 38. Accordingly, the grip portion 52b is sandwiched by the torch mounting member 33 and the torch holding member 37, whereby the welding torch 52 is fixed.

The central axis of the leading end portion of the welding torch 52 having been fixed is aligned with the distal end side link hub central axis QB. The leading end portion of the welding torch 52 is a welding working portion which performs welding onto a work target. The welding torch 52 mounted to the distal end side link hub 3 is disposed between two link mechanisms 4 among the three or more link mechanisms, and the leading end portion of the welding torch 52 faces the proximal end side and protrudes to the proximal end side relative to the proximal end side link hub 2.

With reference to FIG. 1, a cable 58 extends from the root of the welding torch 52, and a tip end of the cable 58 is connected to the wire supply device 53 and the cooling water device 54. The wire supply device 53 is operable to feed the wire at a desired speed to the welding torch 52 in accordance with a command from a welding machine control device (not shown). The cooling water device 54 is operable to supply cooling water for cooling the leading end portion of the welding torch 52. In addition, a pipe and the like (not shown) for supplying shielding gas is also connected to the welding torch 52.

A workpiece 60, which is the work target, is composed of: for example, a cylindrical workpiece 60a; and a block 60b to which the cylindrical workpiece 60a is to be joined by welding, and is disposed below the link actuation device 1. The level in height of the workpiece 60 may be allowed to be adjusted by, for example, a jack mechanism. The workpiece 60 may be placed directly on the ground.

This automatic welding machine performs welding onto the workpiece 60 by means of the welding torch 52 mounted to the distal end side link hub 3, while causing the X-axis linear motion actuator 55 and the Y-axis linear motion actuator 56 to advance and retract so as to move the link actuation device 1 on a horizontal plane, and while changing the posture of the distal end side link hub 3 relative to the proximal end side link hub 2 by actuating the link actuation device 1. Accordingly, welding can be performed onto faces in a plurality of directions of the workpiece 60, at angles relative to the workpiece 60.

As described above, the link actuation device 1 having the welding torch 52 mounted thereto has a wide range of movement of the distal end side link hub 3 and can perform fast operation. Thus, fine and fast operation of the leading end of the welding torch 52 can realized. Thus, precise welding work can be performed onto the workpiece 60. Further, since the wire supply device 53 is provided, even when the distance between the workpiece 60 and the leading end portion of the welding torch 52 varies due to operation of the link actuation device 1, stable welding can be realized.

Since the X-axis linear motion actuator 55 and the Y-axis linear motion actuator 56 are provided so as to advance and retract on a plane perpendicular to the proximal end side link hub central axis QA, welding work can be easily performed on a plane perpendicular to the proximal end side link hub central axis QA, i.e., for example, a horizontal plane. In addition, since the welding torch 52 is disposed such that the central axis of its leading end portion is aligned with the distal end side link hub central axis QB, the angle of the distal end side link hub 3 relative to the horizontal and the angle of the leading end portion of the welding torch 52 relative to the horizontal is the same with each other, and thus, posture control for the leading end portion of the welding torch 52 is easy.

Figure 12:
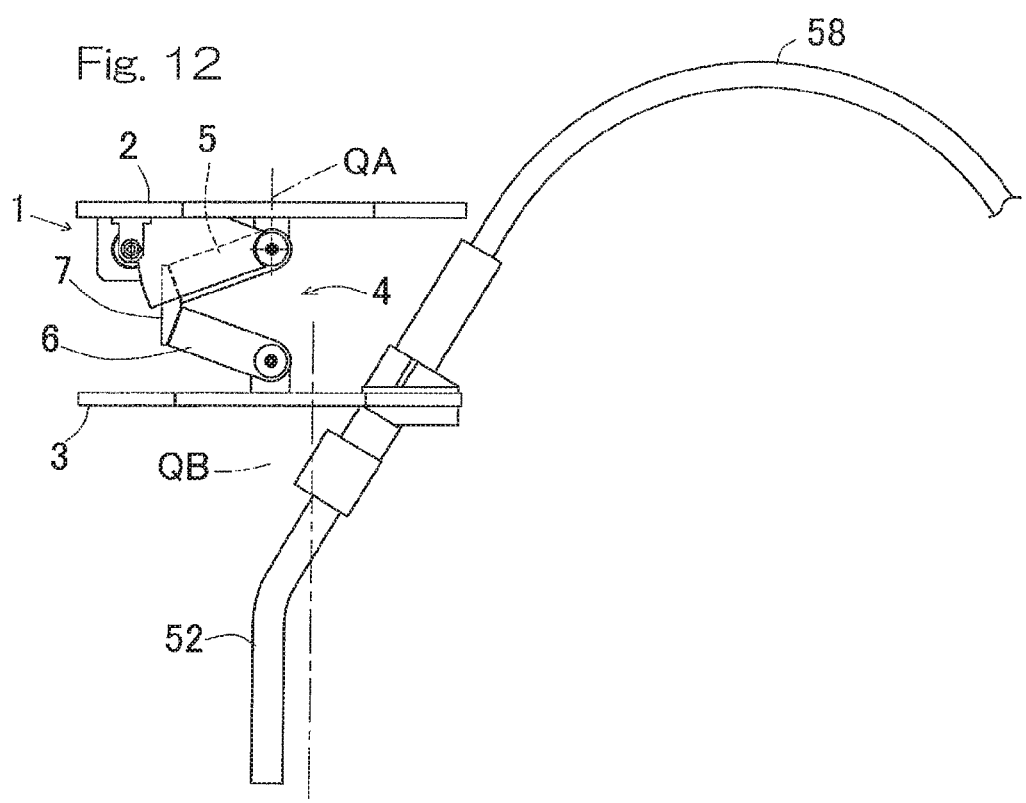
FIG. 12 is a partial view of an automatic welding machine according to a fourth embodiment of the present invention.

The welding torch 52 has an elongated shape in many cases. Thus, if the welding torch 52 is disposed such that the leading end portion thereof faces the distal end side relative to the distal end side link hub 3 as shown in FIG. 12 described later, the moment of inertia is increased, which could cause reduced moving speed or lowered positioning accuracy. However, in the automatic welding machine of the present invention, the welding torch 52 is disposed such that the leading end portion of the welding torch 52 faces the proximal end side link hub 2 side relative to the distal end side link hub 3 and protrudes to the proximal end side relative to the proximal end side link hub 2. Accordingly, the position of the leading end portion of the welding torch 52 comes closer to the rotation center of the link actuation device 1. Thus, the moment of inertia of the welding torch 52 can be reduced, and fast operation and high positioning accuracy can be realized. Further, since the leading end portion of the welding torch 52 among the components of the link actuation device 1 is located in the lowermost portion, the automatic welding machine and the workpiece 60 are less likely to interfere with each other.

Since the angle α, β between the central axis O1, O2, of the revolute pair between the proximal end side/distal end side link hub 2, 3 and the proximal side/distal side end link member 5, 6 and the central axis O3, O4 of the revolute pair between the proximal side/distal side end link member 5, 6 and the intermediate link member 7 is set to be less than 90°, a large space can be secured inside the arrangement of the link mechanisms 4. Thus, it is easy to dispose the welding torch 52 in the space inside the arrangement of the link mechanisms 4.

The welding torch 52 of the present embodiment has a curved shape. Thus, when the central axis of the leading end portion of the welding torch 52 is aligned with the distal end side link hub central axis QB, the root portion of the welding torch 52 is disposed outside the arrangement of the link mechanisms 4. Since the welding torch 52 is disposed between any two of the link mechanisms 4, it is possible to prevent the welding torch 52 from interfering with the link mechanisms 4. Accordingly, even in the case of a configuration in which the welding torch 52 is disposed in the space inside the arrangement of the link mechanisms 4, increase in size of the link actuation device 1 can be prevented.

Figure 8A:
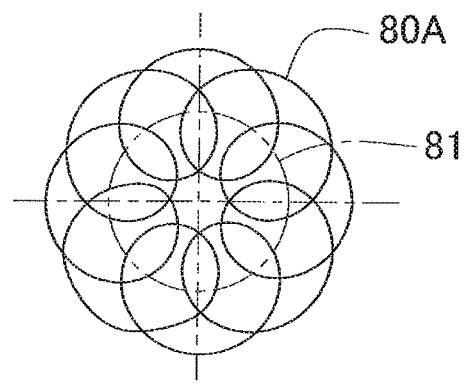
FIG. 8A shows one example of a welding path that includes weaving operation.

FIG. 8A shows an example of welding performed by the use of the automatic welding machine of the first embodiment. A welding path 80A shown in FIG. 8A represents weaving operation in which the welding point advances in the advancing direction while drawing a spiral line relative to a reference line 81 located in the vicinity of the desired welding position. When this automatic welding machine is used, operation along with the reference line 81 is performed by the XY stage 51, and operation in a spiral line is performed by the link actuation device 1, whereby welding along with the welding path 80A can be easily performed. As described above, since the operation along with the reference line 81 and the operation in a spiral line are performed by separate mechanisms, respectively, both of the operations can be easily controlled at the same time. In this example, the reference line 81 is a circle, but even when the reference line 81 has another shape, spiral weaving operation can be performed. When such spiral weaving operation is performed, the direction of the path continuously changes. Accordingly, abrupt change of the moving speed does not occur, and thus, fast and smooth weaving operation can be realized.

The welding path 80A may be determined all by path calculation, or may be determined by creating the reference line 81 through teaching and by designating the diameter of weaving. In either case, since this automatic welding machine allows easy control of the path, teaching work is not necessary or the time for teaching work can be shortened.

Figure 8B:
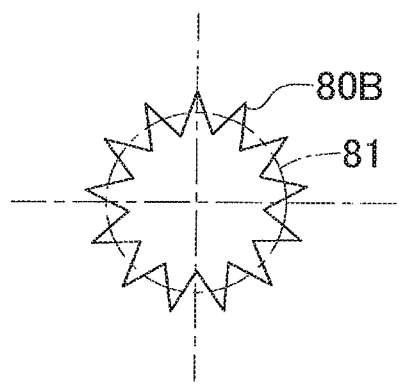
FIG. 8B shows another example of a welding path that includes weaving operation.

FIG. 8B shows a welding path that includes weaving operation that is conventionally performed in general. In a conventional automatic welding machine not having the link actuation device 1 of the first embodiment, spiral weaving operation is difficult to be performed. Thus, as shown in FIG. 8B, weaving operation is performed in which the welding point advances in the advancing direction while drawing a wave shape relative to the reference line 81 located in the vicinity of the desired welding position. In the case of the wave-shape weaving operation, a welding path 80B is easy to be created all through teaching, but the advancing direction is not constant, and the moving speed abruptly changes. Thus, fast movement is difficult to be made. This is because fast movement could cause oscillation of the motor.

Figure 9:
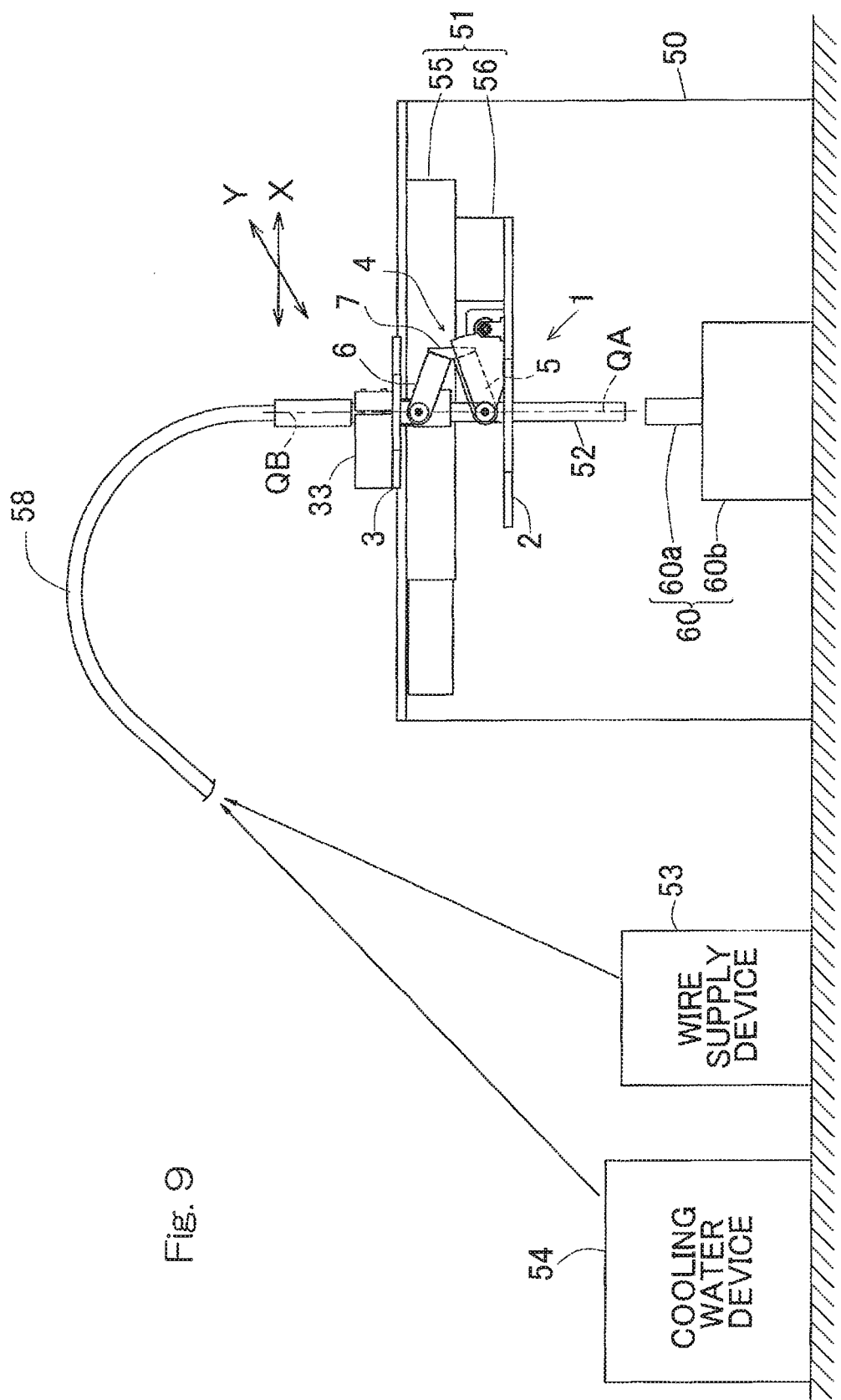
FIG. 9 is a front view showing a state where a different welding torch is mounted to the automatic welding machine in FIG. 1, shown with a part thereof omitted.

FIG. 9 shows an automatic welding machine to which a welding torch different from that shown in FIG. 1 is mounted. The welding torch 52 of the automatic welding machine shown in FIG. 9 has a straight shape, and is mounted to the torch mounting member 33 of the distal end side link hub 3, with the central axis of the welding torch 52 aligned with the distal end side link hub central axis QB. Except the difference in shape of the welding torch 52, the basic configuration of the welding torch 52 is the same as that shown in FIG. 1 to FIG. 7.

When the welding torch 52 having a straight shape is disposed in the center portion of the arrangement of the link mechanisms 4, there is no interference between the welding torch 52 and the link actuation device 1. Thus, even when the angle α, β is 90°, the welding torch 52 can be disposed without increasing the link actuation device 1 in size. However, since the cable 58 of the welding torch 52 extends the vertical direction, handling of the cable 58 is difficult, compared with that in the case of the welding torch 52 having a curved shape.

Figure 10:
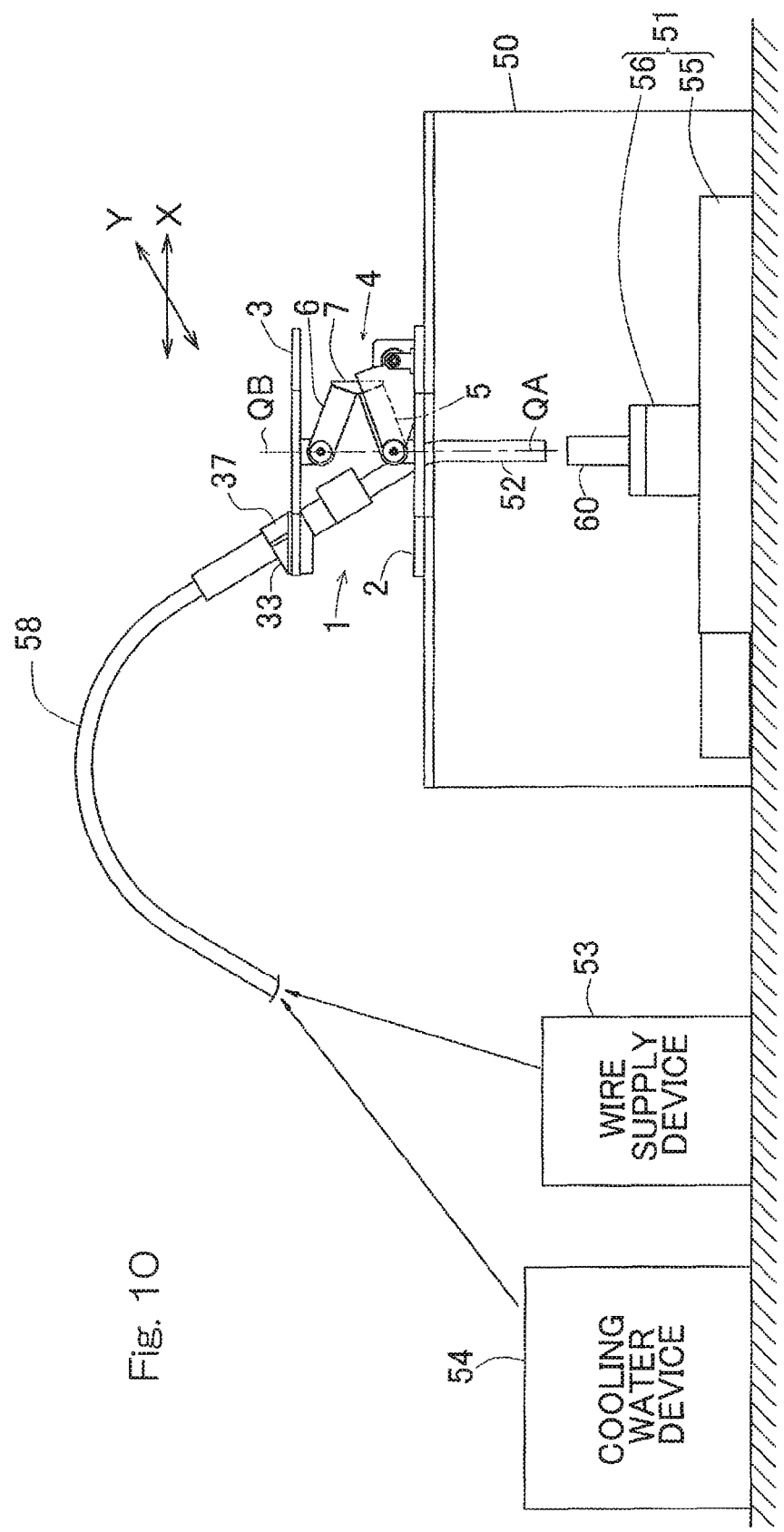
FIG. 10 is a front view of an automatic welding machine according to a second embodiment of the present invention, shown with a part thereof omitted.

FIG. 10 shows an automatic welding machine according to a second embodiment of the present invention. In the automatic welding machine of the second embodiment, the position of the XY stage 51 is different from that in the first embodiment of FIG. 1. The automatic welding machine of the second embodiment has a configuration in which the proximal end side link hub 2 is directly fixed to the mount 50 thereby to set the link actuation device 1, and the workpiece 60 is moved on a horizontal plane by the XY stage 51 disposed on the ground or a work table. In the case of the second embodiment, the XY stage 51 is composed of: the X-axis linear motion actuator 55 disposed on the ground; and the Y-axis linear motion actuator 56 fixed to the stage provided on the top face of the X-axis linear motion actuator 55. The top face of the Y-axis linear motion actuator 56 serves as the stage on which the workpiece 60 is placed. The other configuration is the same as that in the first embodiment shown in FIG. 1.

In the case of the automatic welding machine of the second embodiment, the welding torch 52 whose posture can be changed by the link actuation device 1 performs welding onto the workpiece 60 which is moved on a horizontal plane by the XY stage 51. Accordingly, the same operations and effects as those in the first embodiment shown in FIG. 1 can be obtained.

Other than the first embodiment shown in FIG. 1 and the second embodiment shown in FIG. 10, both of a linear motion actuator which causes the link actuation device 1 to advance and retract relative to the mount 50, and a linear motion actuator which causes the workpiece 60 to advance and retract relative to the mount 50 may be provided (not shown). For example, the link actuation device 1 is caused to advance and retract relative to the mount 50 by the X-axis linear motion actuator 55, and the workpiece 60 is caused to advance and retract relative to the mount 50 by the Y-axis linear motion actuator 56; or vice versa.

Figure 11:
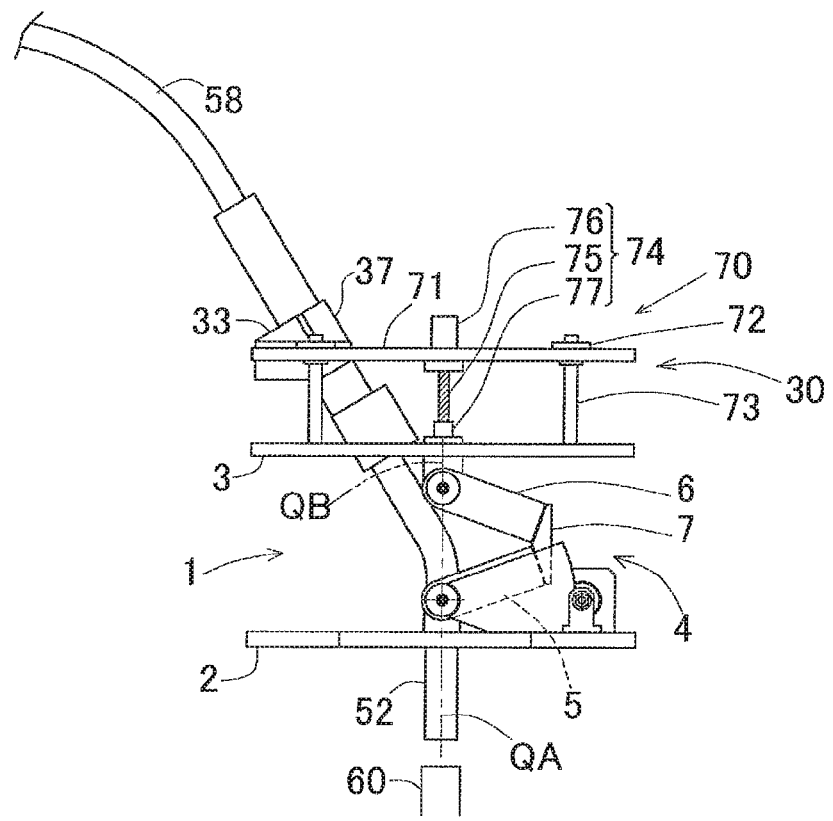
FIG. 11 is a partial view of an automatic welding machine according to a third embodiment of the present invention.

FIG. 11 shows a main portion of an automatic welding machine according to a third embodiment of the present invention. In the automatic welding machine according to the third embodiment, the welding torch 52 is mounted so as to be movable relative to the distal end side link hub 3. In the automatic welding machine of the third embodiment, a torch advancing and retracting linear motion actuator 70, which advances and retracts along with the distal end side link hub central axis QB, is provided at the distal end member 30 of the distal end side link hub 3, and the welding torch 52 is mounted to the torch advancing and retracting linear motion actuator 70. In this configuration, even in a case where the distance between the workpiece 60 and the leading end portion of the welding torch 52 greatly varies due to operation of the link actuation device 1, stable welding can be realized.

The torch advancing and retracting linear motion actuator 70 shown in FIG. 11 has the following configuration. That is, the torch advancing and retracting linear motion actuator 70 has a mounting plate 71 which is disposed on the distal end side of the distal end member 30. The welding torch 52 is mounted to the mounting plate 71 by means of the torch mounting member 33 and the torch holding member 37. A plurality of guide shafts 73 provided to the distal end member 30 are respectively slidably fitted in bushes 72 provided to the mounting plate 71. The mounting plate 71 is guided so as to be movable along with the distal end side link hub central axis QB.

The torch advancing and retracting linear motion actuator 70 causes the mounting plate 71 to advance and retract by means of ball screw mechanism 74. The ball screw mechanism 74 is composed of a ball screw 75 which is rotatably supported by the mounting plate 71 and which extends from the mounting plate 71 towards the proximal end side, a motor 76 which rotates the ball screw 75, and a nut 77 which is fixed in the distal end member 30 and which is thread-engaged with the ball screw 75. The torch advancing and retracting linear motion actuator 70 may have another configuration as long as one-axis positioning is allowed.

FIG. 12 shows a main portion of an automatic welding machine according to a fourth embodiment of the present invention. In the automatic welding machine according to the fourth embodiment, the link actuation device 1 is provided such that the proximal end side link hub 2 is located on the upper side. Also in the fourth embodiment, the welding torch 52 is mounted to the distal end side link hub 3, but different from the first to third embodiments, the link actuation device 1 is disposed upside down. Thus, the leading end portion of the welding torch 52 faces the distal end side relative to the distal end side link hub 3. When the welding torch 52 is mounted as shown in the fourth embodiment, the link actuation device 1 can be downsized, but the moment of inertia acting on the distal end side link hub 3 is increased. Accordingly, fast operation is difficult to be performed. In addition, handling of the cable 58 of the welding torch 52 is difficult.

The present invention is not limited to the embodiments described above, and various additions changes and deletions can be made without departing from the gist of the present invention. Thus, such additions, changes and deletions are to be construed as included within the scope of the present invention.

REFERENCE NUMERALS

1 . . . link actuation device
2 . . . proximal end side link hub
3 . . . distal end side link hub
4 . . . link mechanism
5 . . . proximal side end link member
6 . . . distal side end link member
7 . . . intermediate link member
20 . . . posture changing actuator
50 . . . mount
51 . . . XY stage
52 . . . welding torch
52a . . . curved portion
53 . . . wire supply device
55 . . . X-axis linear motion actuator
56 . . . Y-axis linear motion actuator
60 . . . workpiece
70 . . . torch advancing and retracting linear motion actuator
O1 . . . central axis of revolute pair between proximal end side link hub and proximal side end link member
O2 . . . central axis of revolute pair between proximal side end link member and intermediate link member
O3 . . . central axis of revolute pair between distal end side link hub and distal side end link member
O4 . . . central axis of revolute pair between distal side end link member and intermediate link member
PA . . . proximal end side spherical link center
PB . . . distal end side spherical link center
QA . . . proximal end side link hub central axis
QB . . . distal end side link hub central axis

What is claimed is:

1. An automatic welding machine comprising a link actuation device,
the link actuation device including:
a proximal end side link hub;
a distal end side link hub; and
three or more link mechanisms which each couple the distal end side link hub to the proximal end side link hub such that a posture of the distal end side link hub can be changed relative to the proximal end side link hub, wherein
each of the link mechanisms includes:
a proximal side end link member having one end rotatably coupled to the proximal end side link hub;
a distal side end link member having one end rotatably coupled to the distal end side link hub; and
an intermediate link member having opposite ends rotatably coupled to other ends of the proximal side end link member and the distal side end link member, respectively,
each of the link mechanisms has such a shape that a geometric model of the link mechanism represented by straight lines shows symmetry between a proximal end side portion thereof and a distal end side portion thereof with respect to a center portion of the intermediate link member, and
two or more link mechanisms among the three or more link mechanisms are each provided with a posture changing actuator which arbitrarily changes the posture of the distal end side link hub relative to the proximal end side link hub, the link actuation device being disposed on a mount while the proximal end side link hub is directly or indirectly fixed to the mount, a welding torch being mounted to the distal end side link hub, and the link actuation device being provided with both or either one of a one-or-more-axes linear motion actuator which causes the link actuation device to advance and retract relative to the mount, and a one-or-more-axes linear motion actuator which causes a workpiece to advance and retract relative to the mount, the workpiece serving as a target to be subjected to welding work performed by the welding torch.

2. The automatic welding machine as claimed in claim 1, wherein a point where a central axis of a revolute pair between the proximal end side link hub and each proximal side end link member and a central axis of a revolute pair between each proximal side end link member and the intermediate link member cross each other is referred to as a proximal end side spherical link center, and a straight line that passes the proximal end side spherical link center and that crosses the central axes of the revolute pairs between the proximal end side link hub and each proximal side end link member at a right angle is referred to as a proximal end side link hub central axis, and the one-or-more-axes linear motion actuator causes the link actuation device or the workpiece to advance and retract on a plane perpendicular to the proximal end side link hub central axis.

3. The automatic welding machine as claimed in claim 1, wherein a point where a central axis of a revolute pair between the distal end side link hub and each distal side end link member and a central axis of a revolute pair of each distal side end link member and the intermediate link member cross each other is referred to as a distal end side spherical link center, and a straight line that passes the distal end side spherical link center and that crosses the central axes of the revolute pairs between the distal end side link hub and each distal side end link member at a right angle is referred to as a distal end side link hub central axis, and the welding torch is mounted to the distal end side link hub such that a central axis of a leading end portion, of the welding torch, which performs welding work onto the workpiece is aligned with the distal end side link hub central axis.

4. The automatic welding machine as claimed in claim 1, wherein the welding torch is mounted to the distal end side link hub such that a leading end portion, of the welding torch, which performs welding work onto the workpiece faces the proximal end side and protrudes to the proximal end side relative to the proximal end side link hub.

5. The automatic welding machine as claimed in claim 1, further comprising a wire supply device that automatically supplies a welding rod to the welding torch.

6. The automatic welding machine as claimed in claim 1, wherein a point where a central axis of a revolute pair between the distal end side link hub and each distal side end link member and a central axis of a revolute pair of each distal side end link member and the intermediate link member cross each other is referred to as a distal end side spherical link center, and a straight line that passes the distal end side spherical link center and that crosses the central axes of the revolute pairs at a right angle is referred to as a distal end side link hub central axis, and the welding torch is mounted to the distal end side link hub via a torch advancing and retracting linear motion actuator which advances and retracts along the distal end side link hub central axis.

7. The automatic welding machine as claimed in claim 1, wherein on each of the proximal end side and the distal end side, in the link actuation device, an angle between the central axis of the revolute pair between the link hub and each end link member and the central axis of the revolute pair between each end link member and the intermediate link member is less than 90°.

8. The automatic welding machine as claimed in claim 1, wherein the welding torch has a curved portion, and a part of the welding torch is disposed between any two link mechanisms among the three or more link mechanisms.

* * * * *